Nov. 15, 1949  E. C. HANDWERK ET AL  2,488,398
BASIC LEAD SULFATE
Filed Jan. 30, 1946
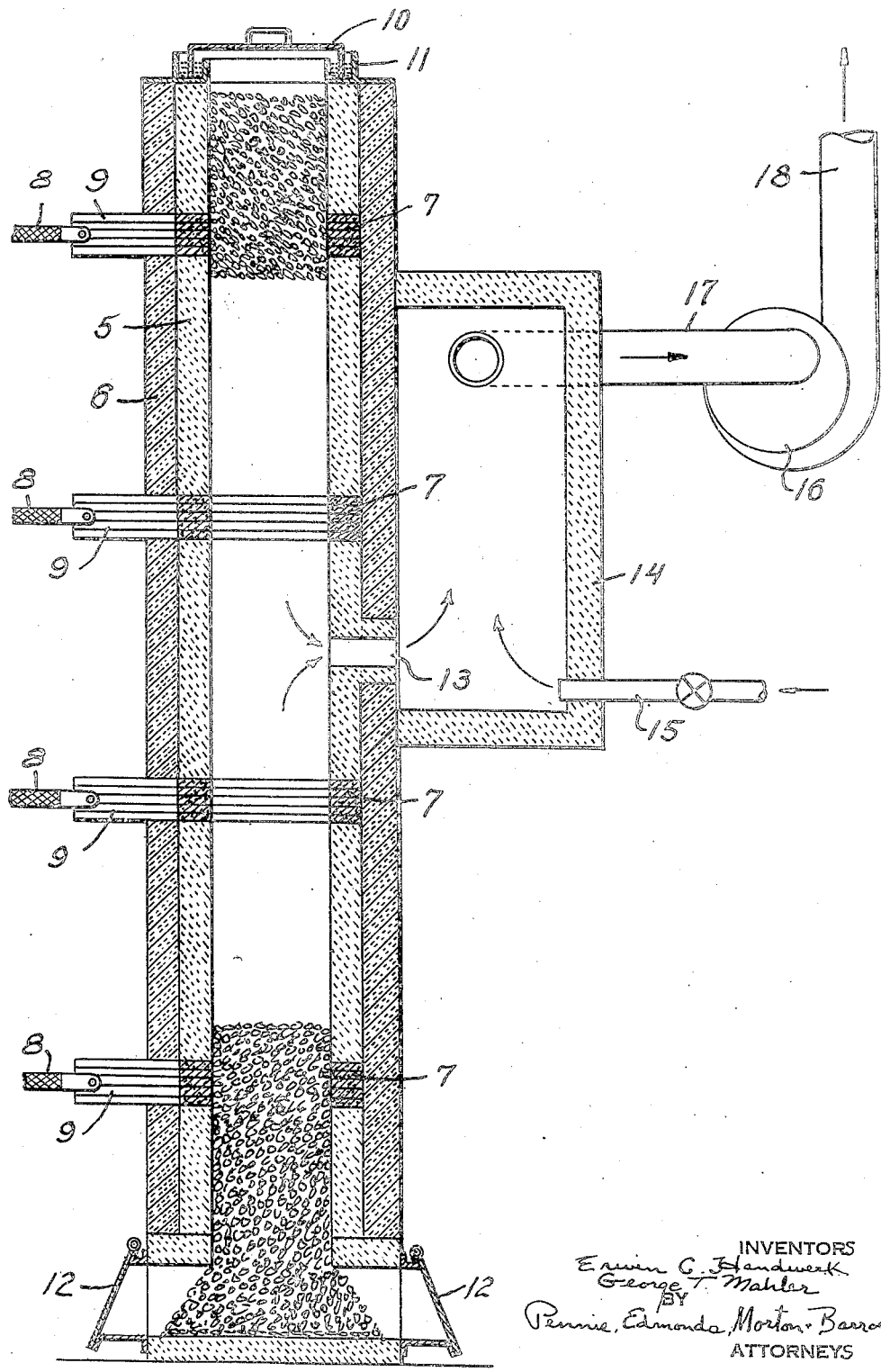
INVENTORS
Erwin C. Handwerk
George T. Mahler
BY
Pennie, Edmonds, Morton & Barrows
ATTORNEYS Patented Nov. 15, 1949

2,488,398

UNITED STATES PATENT OFFICE 2,488,398

BASIC LEAD SULFATE

Erwin C. Handwerk and George T. Mahler, Palmerton, Pa., assignors to The New Jersey Zinc Company, New York, N. Y., a corporation of New Jersey Application January 30, 1946, Serial No. 644,416

10 Claims. (Cl. 23—127)

This invention relates to basic lead sulphate, and has for its object the provision of certain improvements in the production of basic lead sulphate from galena or other appropriate material containing lead sulphide. The invention is especially adapted for the production of basic lead sulphate from argentiferous galena and the like with subsequent recovery of silver and gold.

Basic lead sulphate (sometimes called sublimed white lead) is customarily produced by oxidation of lead sulphide vapor resulting in the formation of a compound of lead oxide and lead sulphate represented by the formula $xPbO \cdot yPbSO_4$. Basic lead sulphate is used industrially as a pigment, either alone or mixed with zinc oxide to form leaded zinc oxide. Basic lead sulphate has heretofore been customarily produced by burning a mixture of galena and fuel, e. g. carbonaceous material, in an oxidizing atmosphere in the course of which lead sulphide is probably first volatilized and promptly oxidized to basic lead sulphate, which is appropriately collected from the resulting fume. Any silver and gold accompanying the galena tend to volatilize and contaminate the basic lead sulphate and hence cannot be recovered. This circumstance makes it uneconomical to use silver or gold bearing galena in this process, since the silver and/or gold are lost. This loss of silver and also of gold occurs even when the charge of galena and fuel is briquetted or agglomerated.

It has heretofore been proposed to heat galena in a non-oxidizing or reducing atmosphere to volatilize lead sulphide without volatilization of silver or gold, and recover the precious metals from the residue. However, serious difficulties are encountered in carrying out this operation, since lead sulphide at or near its boiling temperature attacks the usual furnace refractories with great vigor. When the heating is conducted in an electric furnace, the graphite electrodes are rapidly disintegrated by attack by the galena. No suitable furnace refractory has been found to withstand this attack by boiling lead sulphide. It has been proposed to meet the difficulty by volatilizing finely divided galena in suspension, so that liquid lead sulphide does not come in contact with the furnace refractory. However, any precious metal accompanying the galena is also volatilized in this operation, and it is practically impossible to recover it from the basic lead sulphate fume produced by oxidation of the lead sulphide vapor.

As the result of an exhaustive investigation of the subject, we have found that the fundamental difficulty in volatilizing galena in a non-oxidizing atmosphere is overcome by briquetting the galena with coking coal and then coking the briquettes so as to obtain a coke structure that does not disintegrate during the heating and ensuing elimination of lead sulphide. Such a coked briquette has adequate electric resistance to generate enough heat to volatilize the galena when an appropriate electric current is passed through it. Based on this discovery, our present invention involves heating coked agglomerates of mixed lead sulphide and carbonaceous material under non-oxidizing conditions to a sufficiently high temperature to volatilize lead sulphide. The lead sulphide vapor is withdrawn from the heating zone into a combustion zone where it is oxidized to basic lead sulphate which is appropriately collected from the resulting fume.

In carrying out the invention, galena and coking coal, both preferably finely divided, are mixed and briquetted or otherwise suitably agglomerated, and the briquettes or agglomerates are coked to produce structures possessing adequate strength to withstand without substantial disintegration the subsequent heating action and ensuing elimination of lead sulphide. The coked agglomerates may advantageously be prepared in the manner described in our United States Patent No. 1,875,249. The coking temperature should not exceed 900° C., and oxidation of the agglomerates should be carefully restricted.

The agglomerates may have a high lead sulphide content, say 40 to 65% by weight. The proportion of coke in the agglomerates should be so adjusted that the molten and boiling lead sulphide is held by capillary attraction in the pores of the coke structure and thus prevented for the most part from coming into contact with the furnace refractory, as well as the graphite electrodes when heated in an electric furnace. Agglomerates containing 65 to 55% of galena concentrate, 25% of coking coal, and 10 to 20% of anthracite coal or coke breeze have given excellent results in the practice of the invention. Only a negligibly small amount of molten lead sulphide drips from properly prepared agglomerates during the heating and distillation of the lead sulphide. Since the volatilization of the lead sulphide is carried out under non-oxidizing conditions, the coke is not consumed in the operation. The agglomerates thus retain their original form and dimensions during volatilization of the lead sulphide.

The agglomerates retain a large part of the silver present in the galena, at least two-thirds, and generally more, of the silver remaining in the agglomerates after the lead sulphide has been volatilized. Gold, copper and in general all metallic constituents with boiling points exceeding that of lead sulphide likewise are retained in the worked-off agglomerates. Moreover, the carbon of the coked agglomerates is rendered highly active as a result of the operation. The worked-off agglomerates therefore constitute an attractive product for inclusion in subsequent smelting charges, and especially in the smelting of lead ores in lead blast furnaces for the production of silver-bearing lead. The unconsumed carbon of the worked-off agglomerates provides fuel of a highly desirable character, and the agglomerates contain substantial proportions of silver, gold and copper, present in the galena, which can be economically recovered in subsequent smelting or other suitable operation.

The coked agglomerates may be heated to the contemplated temperature in any appropriate manner and in any suitable type of furnace. However, we now prefer to conduct the heating and distillation of lead sulphide in a vertical shaft furnace equipped for electric resistance heating by passage of an adequate electric current through the column of agglomerates. A suitable equipment for the practice of the invention is diagrammatically illustrated in the single figure of the accompanying drawing, which is an elevation, mostly in section, of the equipment.

The distillation furnace illustrated in the drawing comprises a vertical shaft or retort 5 of any suitable refractory material surrounded by a wall of heat insulation 6. Graphite contact rings 7 are mounted in the wall of the retort 5 so that their inner faces make electrical contact with the column of coked agglomerates within the retort. The retort 5 illustrated in the drawing has four vertically spaced contact rings 7, each of which is electrically connected to a separate electric cable 8 through a graphite lead 9 extending through the insulating wall 6 and contacting the ring. The cables 8 are appropriately connected to a source of single or polyphase electric current in conventional manner. Any other arrangement of the contact rings for connection to other types of electric energy may be employed.

The top of the retort 5 is sealed against the admission of atmospheric air by a charge cap 10 and cooperating peripheral seal 11. Similarly, the bottom of the retort is sealed by discharging doors 12. About midway in its length, the retort has a vapor exit 13 for delivering lead sulphide vapor near the bottom of an oxidizing or combustion chamber 14 built of refractory brick or the like. Air or other suitable oxidizing gas is admitted to the combustion chamber through a supply pipe 15 with its outlet or delivery end positioned approximately opposite the outlet or delivery end of the vapor exit 13 in order to mix the lead sulphide vapor and oxidizing gas promptly after their introduction into the combustion chamber. The fume resulting from the oxidation of the lead sulphide vapor is withdrawn from near the top of the combustion chamber by a fan 16 and connecting flue 17, and is delivered through a flue 18 to appropriate apparatus for the collection of the basic lead sulphate, such for example as a conventional baghouse (not shown).

In practicing the invention in the equipment illustrated in the drawing, the retort 5 is filled with the charge column of coked agglomerates. Worked-off agglomerates are withdrawn from the bottom of the retort from time to time, through the discharging doors 12, and an equivalent amount of fresh coked agglomerates is introduced on top of the charge column, whereby the furnace is operated and distillation of lead sulphide conducted in a substantially continuous manner. The freshly introduced agglomerates are preferably preheated, and to this end may advantageously be transferred directly from the coking furnace to the distillation retort with a minimum loss of heat. Electric current passes through the charge column of coked agglomerates and the charge is thereby heated to a sufficiently high temperature to volatilize lead sulphide, say about 1425–1450° C. Air is excluded from the retort, and the heating is conducted under non-oxidizing conditions. The lead sulphide content of the agglomerates is volatilized and the resulting lead sulphide vapor is withdrawn from the retort, through the vapor exit 13, into the combustion chamber 14. Location of the vapor exit midway of the ends of the retort provides relatively short paths within the charge column for the flow of the evolved lead sulphide vapor, and insures substantially complete elimination or working-off of the lead sulphide. Air or other suitable oxidizing gas is introduced into the combustion chamber through the pipe 15 in amount regulated to give the desired ratio of lead oxide and lead sulphate in the basic lead sulphate produced. The basic lead sulphate product collected from the fume withdrawn from the combustion chamber has the usual characteristics of a fumed pigment, and may be subjected to such subsequent treatment as is customary in the case of such pigments.

The residue or worked-off agglomerates withdrawn from the retort retain for the most part their original form and dimensions. They consist principally of the original coke structure with the carbon highly activated, are extremely porous due to the elimination of lead sulphide, and retain economically recoverable amounts of any silver, gold, copper and the like (and also small amounts of lead) present in the galena or other source of lead sulphide. The worked-off agglomerates may advantageously be used as fuel, and when containing precious metals constitute a valuable inclusion in the charge of lead blast furnaces for the production of silver or other precious metal bearing lead.

We claim:

1. The improvement in the method of producing basic lead sulphate which comprises introducing coked agglomerates of mixed lead sulphide and carbonaceous material into a closed heating zone, heating the coked agglomerates to a sufficiently high temperature to volatilize lead sulphide in the absence of extraneously introduced gases and in the presence of only such gases as are produced by the heating of said coked agglomerates, withdrawing the resulting lead sulphide vapor from the non-oxidizing heating zone into a separate and independent combustion zone, introducing air into the combustion zone and thereby oxidizing the lead sulphide vapor to basic lead sulphate, and collecting the resulting basic lead sulphate.

2. The improvement in the method of producing basic lead sulphate which comprises introducing a charge of coked agglomerates of mixed silver-bearing lead sulphide and carbonaceous material into a closed heating zone, heating the charge to a sufficiently high temperature to volatilize lead sulphide in the absence of extraneously introduced gases and in the presence of only such gases as are produced by the heating of said coked agglomerates, the coked agglomerates possessing adequate strength to withstand without substantial disintegration the heating action and ensuing elimination of lead sulphide, withdrawing from the charge the resulting lead sulphide vapor, oxidizing the withdrawn lead sulphide vapor to basic lead sulphate in a zone separate and independent of the heating zone, collecting the resulting basic lead sulphate, and recovering the residual worked-off agglomerates for subsequent smelting to recover silver.

3. The method of claim 2 in which the charge of coked agglomerates is electrically heated by the passage of electric current therethrough.

4. The improvement in the method of producing basic lead sulphate which comprises introducing a charge of coked agglomerates of mixed lead sulphide and carbonaceous material into a closed heating zone, passing electric current through the charge of coked agglomerates and thereby heating the charge to a sufficiently high temperature to volatilize lead sulphide in the absence of extraneously introduced gases and in the presence of only such gases as are produced by the heating of said coked agglomerates, said coked agglomerates having adequate strength to withstand without substantial disintegration the heating action and ensuing elimination of lead sulphide, withdrawing from the charge the resulting lead sulphide vapor, oxidizing the withdrawn lead sulphide vapor to basic lead sulphate in a zone separate and independent of the heating zone, and collecting the resulting basic lead sulphate.

5. The improvement in the method of producing basic lead sulphate which comprises passing a column of coked agglomerates of mixed lead sulphide and carbonaceous material through a vertical shaft furnace sealed at each end against the admission of atmospheric air, heating the column of agglomerates to a sufficiently high temperature to volatilize lead sulphide in the absence of extraneously introduced gases and in the presence of only such gases as are produced by the heating of said coked agglomerates, withdrawing the resulting lead sulphide vapor from the furnace, oxidizing the withdrawn lead sulphide vapor to basic lead sulphate, and collecting the resulting basic lead sulphate.

6. The method of claim 5 in which the charge of coked agglomerates is electrically heated by the passage of electric current therethrough.

7. The method of claim 5 in which the lead sulphide vapor is withdrawn from the furnace at a point about midway of its ends.

8. The improvement in the method of producing basic lead sulphate which comprises passing a column of coked agglomerates of mixed lead sulphide and carbonaceous material through a vertical shaft furnace, heating the column of agglomerates by passing electric current therethrough to a sufficiently high temperature to volatilize lead sulphide in the absence of extraneously introduced gases and in the presence of only such gases as are produced by the heating of said coked agglomerates, the coked agglomerates possessing adequate strength to withstand without substantial disintegration the heating action and ensuing elimination of lead sulphide, withdrawing the resulting lead sulphide vapor from the furnace into a combustion chamber, introducing air into the combustion chamber and oxidizing the lead sulphide vapor to basic lead sulphate, and collecting the resulting basic lead sulphate.

9. The improvement in the method of producing basic lead sulphate which comprises passing a column of coked agglomerates of mixed lead sulphide and carbonaceous material through a vertical shaft furnace sealed at each end against the admission of atmospheric air, heating the column of agglomerates by passing electric current therethrough to a sufficiently high temperature to volatilize lead sulphide in the absence of extraneously introduced gases and in the presence of only such gases as are produced by the heating of said coked agglomerates, the coked agglomerates possessing adequate strength to withstand without substantial disintegration the heating action and ensuing elimination of lead sulphide, withdrawing lead sulphide vapor from the furnace at a point about midway of its ends, oxidizing the withdrawn lead sulphide vapor to basic lead sulphate, and collecting the resulting basic lead sulphate.

10. The improvement in the method of producing basic lead sulphate and recovering silver from argentiferous galena, which comprises introducing coked agglomerates of mixed argentiferous galena and carbonaceous material into a closed heating zone, the coked agglomerates possessing adequate strength to withstand without substantial disintegration the heating action and ensuing elimination of lead sulphide therefrom, heating the coked agglomerates to a temperature sufficiently high to volatilize lead sulphide in the absence of extraneously introduced gases and in the presence of only such gases as are produced by the heating of said coked agglomerates, withdrawing from the charge the resulting lead sulphide vapor, oxidizing the withdrawn lead sulphide vapor to basic lead sulphate in a zone separate and independent of the heating zone, collecting the resulting basic lead sulphate, and including the residual worked-off agglomerates in a smelting charge for recovering silver therefrom.

ERWIN C. HANDWERK.
GEORGE T. MAHLER.

REFERENCES CITED

The following references are of record in the file of this patent:

UNITED STATES PATENTS

| Number | Name | Date |
| --- | --- | --- |
| 281,047 | Frasch | July 10, 1883 |
| 372,898 | Dewey | Nov. 8, 1887 |
| 554,725 | Picher | Feb. 18, 1896 |
| 679,330 | Peterson | July 30, 1901 |
| 920,388 | Picher | May 4, 1909 |
| 955,396 | Hannay et al. | Apr. 19, 1910 |
| 1,013,931 | Fink | Jan. 9, 1912 |
| 1,322,090 | Breyer et al. | Nov. 18, 1919 |
| 1,495,410 | Gitsham et al. | May 27, 1924 |
| 1,706,301 | Kendall | Mar. 19, 1929 |
| 1,743,964 | Gaskill | Jan. 14, 1930 |
| 1,875,249 | Mahler et al. | Aug. 30, 1932 |
| 1,998,440 | Bunce et al. | Apr. 23, 1935 |

OTHER REFERENCES

Hofman, "Metallurgy of Lead," published by McGraw-Hill Book Co., Inc., New York (1918), page 42.